United States Patent
Istrati et al.

(10) Patent No.: US 10,498,679 B2
(45) Date of Patent: Dec. 3, 2019

(54) METHOD AND DEVICE FOR SPAM SMS DETECTION

(71) Applicant: BICS SA/NV, Brussels (BE)

(72) Inventors: Gabriel Istrati, Timisoara Timis (RO); Arun Madhusoodanapanicker, Brussels (BE)

(73) Assignee: BICS SA/NV, Brussels (BE)

( * ) Notice: Subject to any disclaimer, the term of this patent is extended or adjusted under 35 U.S.C. 154(b) by 0 days.

(21) Appl. No.: 15/555,208

(22) PCT Filed: Jul. 12, 2017

(86) PCT No.: PCT/EP2017/067545
§ 371 (c)(1),
(2) Date: Sep. 1, 2017

(87) PCT Pub. No.: WO2018/011264
PCT Pub. Date: Jan. 18, 2018

(65) Prior Publication Data
US 2018/0351897 A1 Dec. 6, 2018

(30) Foreign Application Priority Data
Jul. 15, 2016 (EP) ..................................... 16179790

(51) Int. Cl.
*G06F 15/16* (2006.01)
*H04L 12/58* (2006.01)
(Continued)

(52) U.S. Cl.
CPC .............. *H04L 51/12* (2013.01); *H04L 51/38* (2013.01); *H04W 4/14* (2013.01); *H04W 88/184* (2013.01); *H04M 1/72552* (2013.01)

(58) Field of Classification Search
CPC ........... H04L 51/12; G06F 15/16; G06F 17/30
See application file for complete search history.

(56) References Cited

U.S. PATENT DOCUMENTS 8,612,436 B1 * 12/2013 Grundman ........ G06F 16/24578
707/735
8,925,087 B1 12/2014 Oliver et al.
(Continued)

OTHER PUBLICATIONS

Damiani et al., "An Open Digest-based Technique for Spam Detection", Jan. 2004, 6 Pages.
(Continued)

*Primary Examiner* — Myron Wyche
(74) *Attorney, Agent, or Firm* — Workman Nydegger

(57) ABSTRACT

A method to detect spam SMS messages including unsolicited repeated SMS messages originating from or sent to one or more subscribers of one or more mobile communication networks, comprises: clustering messages in similarity clusters, wherein each similarity cluster comprises SMS messages with identical or similar content; counting an amount of SMS messages in each similarity cluster; monitoring a rate of SMS messages in each similarity cluster; and classifying SMS messages of a similarity cluster as spam when the amount of SMS messages in the similarity cluster exceeds a certain first threshold and the rate of SMS messages for the similarity cluster exceeds a certain second threshold.

11 Claims, 6 Drawing Sheets

(51) Int. Cl.
*H04W 4/14* (2009.01)
*H04W 88/18* (2009.01)
*H04M 1/725* (2006.01)

(56) References Cited

U.S. PATENT DOCUMENTS

| | | |
|---|---|---|
| 2004/0148330 A1* | 7/2004 | Alspector ............ G06Q 10/107 709/200 |
| 2005/0278620 A1* | 12/2005 | Baldwin ................ H04L 51/12 715/201 |
| 2008/0102799 A1 | 5/2008 | Dholakia et al. |
| 2011/0106890 A1 | 5/2011 | Karpov et al. |
| 2013/0018906 A1 | 1/2013 | Nigam et al. |
| 2014/0052674 A1* | 2/2014 | Aggarwal ............... G06Q 50/01 706/12 |
| 2015/0142809 A1 | 5/2015 | Chandrasekharappa et al. |
| 2016/0188725 A1* | 6/2016 | Wang ................ G06F 16/9535 707/734 |

OTHER PUBLICATIONS

European Search Report From EP Application No. EP16179790, dated Jan. 11, 2017.

\* cited by examiner

METHOD AND DEVICE FOR SPAM SMS DETECTION

FIELD OF THE INVENTION

The present invention generally relates to detection of spam messages, i.e. unsolicited repeated messages sent from or to one or more subscribers in a communication network. The invention in particular concerns a detection method and device for spam Short Message Service (SMS) messages sent in mobile communication networks to promote unsolicited commercials, or even worse to fraudulently trigger user actions like calls to special numbers that result in high termination fees for the user.

BACKGROUND OF THE INVENTION

Spamming is a revenue generating business that dramatically impacts the user experience for subscribers that receive the spam messages. Spam messages typically contain unsolicited advertisements or invitations to take actions like the sending of an opt out message for certain services or the making of a call to a special number. The sending of such opt out message and the making of calls to special numbers as promoted by spam typically generate high termination costs for the user.

SMS messages have certain particularities as a result of which spam detection techniques that are deployed for other types of messages, e.g. e-mail, are not necessarily applicable or efficient. SMS messages have a maximum length of 160 bytes as a consequence of which the information contained therein is very condensed. Spam SMS messages are sent to mobile subscribers in different countries. The language of the content of spam SMS messages often is adapted depending on the home network or visited country. Hence, different subscribers will receive different text patterns depending on their home network or visited network. Further, spam SMS generators apply various obfuscation techniques to avoid being detected. For instance, some letters or characters may be removed, special characters may be inserted, unique numbers or URLs may be generated randomly and inserted in spam SMS messages, etc., to hide the repetitive character of such messages for spam filters installed by mobile network operators.

There is a general demand by mobile network operators for a technique that adequately detects and reports spam SMS messages such that mobile network operators can real-time white-list certain traffic (and consequently allow such traffic), and black-list the spam messages (and consequently block such spam messages).

A first type of existing SMS spam detection techniques relies on content screening and predefined rules.

United States Patent Application US20050278620A1 entitled "Methods, Systems and Computer Program Products for Content-Based Screening of Messaging Service Messages" for instance describes content-based SMS/MMS spam detection and discarding. The content of SMS/MMS messages is screened. Through a GUI, a subscriber must upfront specify in rules which content he/she does not want to receive. For instance, SMS messages containing the word "Viagra" may be discarded automatically (see [0013] of US20050278620A1).

Spam detection and reporting techniques that rely on content inspection are privacy intrusive by definition. Moreover, the user or operator must upfront specify what content elements represent spam indicators. Thus, the filter will not block spam messages with content that has not been specified in rules upfront. Furthermore, obfuscation mechanisms such as replacing letters or characters may be applied by spam generators to avoid being detected.

A second type of known spam SMS detection techniques relies on monitoring of traffic sources. When traffic sources deploy certain behaviour, they are identified as spam sources and their traffic gets blocked.

United States Patent Application US20110106890A1 entitled "Methods, Systems and Computer Program Products for a Mobile-Terminated Message Spam Restrictor" for instance describes an SMS gateway that monitors the traffic from various sources. When SMS traffic of a source exceeds a certain limit, the source gets blocked.

Spam detection through source monitoring has as main disadvantage that it can be circumvented through anti-detection measures like transmitting spam SMS from different sources.

A third type of existing spam SMS detection techniques detects traffic that comes with a repeated pattern and applies some hash technique to reduce the sensitivity for obfuscation measures taken by spam generators.

The article "An Open Digest-based Technique for Spam Detection" from the authors E. Damiani, S. De Capitani di Vimercati, S. Paraboschi and P. Samarati for instance describes an open source technique based on locality sensitive hashing to group identical/similar messages while remaining insensitive for the anti-detection measures described in paragraph 4 of this article. The article seems to focus on bulk e-mail rather than SMS. In order to be able to establish that a group of identical messages constitutes spam, the system described in this article relies on a user's opinion that a certain e-mail is spam. The system in other words requires user collaboration.

U.S. Pat. No. 8,925,087B1 entitled "Apparatus and Methods for In-The-Cloud Identification of Spam and/or Malware" describes another spam detection technique for e-mail. It is mentioned however in Col. 3, lines 43-44 of U.S. Pat. No. 8,925,087B1, that the scanned messages may be text messages as an alternative to e-mail. A host computer that receives an e-mail message, calculates a locality sensitive hash, e.g. the Nilsimsa hash, to group identical or similar messages. The calculated hash value is sent to a central system for analysis. The central system aims at detecting a group of similar hash codes to identify spam clusters. The technique known from U.S. Pat. No. 8,925,087B1 however also relies on a query from the user or receiving host computer and is therefore reactive, just like the method described by E. Damiani et al.

Reactive spam detection techniques such as the ones known from Damiani et al. or U.S. Pat. No. 8,925,087B1 have as disadvantage that a received message must first be identified as suspicious or potential spam by the user or operator before a query is launched and further analysis takes place. As a consequence, a significant amount of spam messages may already have been passed over before any action is taken.

United States Patent Application US 2004/0148330 A1, entitled "Group Based Spam Classification", describes a technique for detecting spam e-mail that could also be used for SMS messages, as indicated in paragraph of US 2004/0148330 A1. E-mails are clustered into groups of substantially similar e-mails. Thereafter, the spam signature of one or more test e-mails is determined (FIG. 6: 630). When a single test mail is evaluated as spam (FIG. 4: 470; FIG. 5: 540; FIG. 7: 770), or when a predetermined threshold proportion of test mails is evaluated as spam, the entire cluster of similar mails becomes classified and labeled as spam (FIG. 4: 480; FIG. 5: 550; FIG. 7: 780). Optionally, the growth rate of a cluster is monitored and clusters that do not experience a predetermined minimum growth rate are eliminated, i.e. not considered spam, before the evaluation of test mails takes place.

Just like the method described in U.S. Pat. No. 8,925, 087B1, the spam detection technique known from US 2004/0148330 A1 relies on the identification of at least one test mail as spam, and therefore is rather reactive: the user initially is not protected from spam. Moreover, such technique typically relies on word matching, i.e. the presence of words that are indicative for spam. This is feasible for e-mail but is more difficult to successfully apply for SMS given the particularities of SMS: restriction in length to 140 bytes with 8-bit characters, elimination of vocals or use of alternate abbreviations instead of full words, etc.

SUMMARY OF THE INVENTION

It is an objective of the present invention to disclose a spam SMS detection and reporting method and tool that overcome one or more of the above mentioned drawbacks of existing solutions. More particularly, it is an objective of the present invention to disclose a method and device for spam SMS detection that operates in real-time, without intervention of the user or operator, to instantly identify and report spam in a manner that is not privacy intrusive and that is resistant to obfuscation techniques implemented by spam generators.

According to the present invention, the above identified objective is realized by the method to detect spam SMS messages, i.e. unsolicited repeated SMS messages originating from or sent to one or more subscribers of one or more mobile communication networks, the method comprising:
  clustering SMS messages in similarity clusters, wherein each similarity cluster comprises SMS messages with identical or similar content;
  counting an amount of SMS messages in each similarity cluster;
  monitoring a rate of SMS messages in each similarity cluster; and
  classifying SMS messages of a similarity cluster as spam when the amount of SMS messages in the similarity cluster exceeds a certain first threshold and the rate of SMS messages for the similarity cluster exceeds a certain second threshold.

Thus, the method according to the invention introduces real-time processing of incoming SMS messages to identify repetitive patterns and to report such repetitive pattern as spam when its volume, i.e. the number of SMS messages with the same pattern, and its rate, i.e. the pace or velocity of SMS messages with the same pattern, exceed certain predefined limits. The method first applies an inverse obfuscation technique by grouping incoming SMS messages in similarity clusters, i.e. buckets of SMS messages that have a limited distance calculated based on distance function, hash or key that preferably is not privacy intrusive. As an example, SMS messages with same characteristics such as a similar length and/or similar byte level distribution will be clustered together. Further, the method applies some convergence process based on the size of a cluster and occurrence rate of SMS messages in a cluster to distinguish spam from regular person-to-person text messages exchanged between subscribers. The method is suitable for being executed by an international carrier positioned in between plural mobile communication networks. When applied by an international carrier, the method according to the invention takes advantage of the fact the same or similar pattern would be detected faster in many SMS messages since the international carrier has a view on SMS traffic originating from or terminated in multiple mobile communication networks. An international carrier applying the method according to the present invention hence can identify and report spam fast to mobile operators, enabling mobile operators to decide based on the reported parameters what action to take case by case. The similarity clusters enable the method according to the present invention to remain insensitive for obfuscation techniques applied by spam generators, such as the removal/addition of letters, numbers or special characters, the insertion of unique codes, addresses or URLs, randomly generated, or the like. Further, the method according to the invention does not rely on a request or hint from a subscriber to investigate a certain message, neither does it require that a subscriber identifies an SMS message as spam in order to classify similar messages belonging to the same cluster as spam. The method according to the invention operates autonomously and pro-actively. No information is needed from subscribers or operators. Once a similarity cluster has been identified as a spam cluster, all new SMS messages with similar pattern will automatically be black-listed and reported as spam messages.

Optionally, the method to detect spam SMS messages according to the present invention comprises:
  upon receipt of each SMS message, determining a spam key value by applying locality-sensitive hashing, each spam key value corresponding to a similarity cluster;
  determining a spam classification value as 0 when the spam key value is no repeated value, or as a value greater than 0 when the spam key value is a repeated value, the value greater than 0 being determined based on a spam score, i.e. the amount of SMS messages in the similarity cluster corresponding to the spam key value, and a spam velocity, i.e. the rate of SMS messages in the similarity cluster having the spam key value; and
  storing the spam key value, associated spam score and associated spam classification value for the similarity cluster in memory.

Thus, embodiments of the spam detection method according to the present invention rely on locality-sensitive hashing to determine a hash or so called spam key value for each incoming SMS message, and further introduce a spam classification value calculated for each incoming message using threshold based rules. The spam key value is a unique key that corresponds with a similarity cluster. Hence, SMS messages for which the locality-sensitive hashing algorithm generates the same spam key value are classified in the same similarity cluster. The locality-sensitive hashing provides immunity for certain obfuscation techniques like insertion and deletion of certain characters. As long as no repeated pattern is recognized, i.e. SMS messages for which the locality-sensitive hashing algorithm generates a spam key value that is not yet generated before, the spam classification value is made 0. As soon as a repeated pattern is recognized, i.e. an SMS message for which the locality-sensitive hashing algorithm generates a spam key value that has been generated before, the spam score and spam velocity for that spam key value are adapted or calculated, and from the spam score and spam velocity the spam classification value is determined as a value greater than 0. This way, classes can be generated wherein a repeated pattern has been detected but which are waiting for further confirmation as spam, and a class can be generated wherein certain minimum thresholds are exceeded by the spam score and/or spam velocity to be identified as spam. The spam score may for instance be implemented as a counter for SMS messages having the same spam key value. The spam velocity may for instance be implemented as a counter for SMS messages received per minute and having the same spam key value, or may be implemented through a timer counting the time, e.g. in seconds or minutes, lapsed since receipt of the last SMS message with the same spam key value. In alternate implementations, the spam classification value may of course be chosen differently, e.g. a value different from 0 may be associated with spam key values as long as no repetitive pattern is recognized. In embodiments of the invention that calculate a spam key value and spam classification value, the spam key value, associated spam score and associated spam classification value are memorized. Optionally, also the associated spam velocity value or the time of arrival of the last SMS message with same spam key value may be stored for later usage.

Further optionally, the locality-sensitive hashing in the method to detect spam SMS messages according to the present invention determines a hash value for the SMS message corresponding to the spam key value for the SMS message from:
  a top 30%-top 40% bytes distribution of the SMS message;
  a similarity distance between the top 30%-top 40% bytes distribution and a hypothetical distribution;
  a similarity distance value between blocks of text;
  the length of the SMS message; and
  the calling address of the SMS message.

Thus, embodiments of the present invention rely on the top x % bytes distribution as an index for the locality-sensitive hash algorithm, x being a configurable parameter chosen for instance between 30 and 40. This way, the method according to the invention becomes immune to further obfuscation techniques such as the introduction of unique codes, addresses or URLs in spam messages. For instance, the similarity distance may be calculated between the top x bytes in the original distribution and some hypothetical distribution having the same size as the maximum allowed message length. In embodiments of the invention, the similarity distance may be refined to blocks of text to further enforce the insensitivity for obfuscation techniques in cases of spam messages with shorter texts wherein common characters are being used. Since spam messages will generally share similar lengths, embodiments of the present invention also may consider the length of messages when calculating the spam key value for similarity clustering. This way, SMS messages in a single cluster will have equal or nearly-equal lengths. Further, embodiments of the present invention may consider the calling address in calculating the spam key value, as spam messages are often sent from a single calling node. SMS messages sharing the same pattern thus also are expected to share the same origin, i.e. the node generating the spam traffic.

According to a further optional aspect of the method to detect spam SMS messages according to the present invention, the similarity distance between the top x % bytes distribution and a hypothetical distribution corresponds to a cosine similarity distance, and the similarity distance value between blocks of text corresponds to a cosine similarity distance.

In other words, preferred embodiments of the present invention rely on a cosine similarity distance to calculate the spam key value, for instance the cosine similarity python distance. Obviously, the present invention may be implemented using alternate similarity distance functions, e.g. Hamming distance or Sorensen's similarity quotient.

In embodiments of the method to detect spam SMS messages according to the present invention,
  when the spam key value is no repeated value, determining the spam classification value comprises:
    making the spam classification value 0; and
    storing the spam key value, associated spam score and associated spam classification value in memory.

Indeed, as already indicated here above, the method according to the present invention maintains a level of suspicion for the different spam key values or similarity clusters. As long as no repeated messages are received, i.e. a spam key value is generated for the first time, the corresponding suspicion level or spam classification value is made zero. The spam score will be made 1 as it is the first SMS message with that spam key value. Spam score and spam classification value are stored in relation to the unique spam key value that is generated for the received SMS message.

Optionally, storage of the spam key value, associated spam score and associated spam classification value expires when a first time threshold exceeds and no repeated SMS message with identical spam key value is received.

Indeed, a first time threshold may be specified, e.g. 1 minute, and a spam key value that is generated as a result of receipt of a first SMS message may expire if no repeated message, i.e. a second SMS message that generates the same spam key value, is received within this first time threshold. Expired spam key values may automatically be released from further storage to reduce or avoid unnecessary memory occupancy.

In embodiments of the method to detect spam SMS messages according to the present invention,
  when the spam key value is a repeated value with associated spam classification value equal to 0, determining the spam classification value comprises:
    increasing an associated spam score for the spam key value by 1; and
    making the spam classification value equal to 1 when the spam score exceeds a first spam threshold within a first time threshold.

Thus, in case a received SMS message generates a spam key value that is already stored in memory, i.e. a repeated spam key value, the associated spam score associated with that spam key value must be increased by one to correctly reflect the counted number of received similar SMS messages. As soon as the spam score exceeds a certain first spam threshold of SMS messages that must be received within the first time threshold, the level of suspicion or so called spam classification value may be increased from zero (0) to one (1). The first spam threshold may for instance be 2 SMS messages that must be received within the first time threshold, e.g. 1 minute. The increased spam classification value indicates that a repeated pattern is recognized which is suspected of being spam but further confirmation is required before SMS messages belonging to this similarity cluster are really black-listed as spam.

Further optionally, storage of the spam key value, associated spam score and associated spam classification value expires when a second time threshold exceeds and no repeated SMS message with identical spam key value is received or alternatively when the spam velocity drops below a first spam velocity threshold.

Indeed, a repeated spam key value may be kept in observation for a second time interval that is typically longer than the first time interval. As an example, a second time threshold of for instance 5 minutes may be set wherein a spam key value whose associated spam classification value is equal to 1 is monitored. In case no repeated SMS message is received within that second time interval or in case the spam velocity drops below a first spam velocity threshold of for instance 1 SMS message/5 minutes, the spam key value is released from further storage. The SMS messages in such similarity cluster are considered not to constitute spam. The corresponding spam key value, spam score, spam classification value and eventual spam velocity value are deleted from storage to avoid unnecessary occupancy of memory resources.

In embodiments of the method to detect spam SMS messages according to the present invention,
  when the spam key value is a repeated value with associated spam classification value equal to 1, determining the spam classification value comprises:
    increasing an associated spam score for the spam key value by 1;
    making the spam classification value equal to 2; and
    reporting presence of a spam SMS message.

Indeed, when a received SMS message generates a repeated spam key value whose associated spam classification value already indicates suspected spam, this SMS message is seen as a confirmation as a result of which the level of suspicion is increased to two (2). Alternatively, the repeated pattern may have to exceed a minimum threshold, i.e. x repeated messages must be received before the level of suspicion is increased to two (2). A consequence of the spam classification value equal to two is that the repetitive nature is considered strong enough for the SMS messages to be classified as spam. The spam key value with associated spam classification value equal to 2 will be monitored for a longer time interval, e.g. up to a third time threshold of for instance 24 hours, and all SMS messages that generate the same spam key value will instantly be identified and reported as spam such that mobile network operators can take appropriate measures, like marking such SMS messages, non-delivery of such SMS messages, blocking sources of such SMS traffic, etc.

According to a further optional aspect, storage of the spam key value, associated spam score and associated spam classification value expires when a third time threshold expires and no repeated SMS message with identical spam key value is received or alternatively when the spam velocity drops below a second spam velocity threshold.

As mentioned here above, similarity clusters or spam key values that are classified as spam, are typically monitored for a longer period of time, i.e. up to a third time threshold of for instance 24 hours. In case no further SMS messages are received that generate this spam key value or in case the spam velocity drops below a second velocity threshold, e.g. 1 SMS per 24 hours, the corresponding spam key value and its associated spam classification value, spam score and eventual spam velocity that were stored in memory are released from further storage for memory resource efficiency reasons.

In addition to a method for spam SMS detection the present invention also relates to a corresponding device to detect spam SMS messages, i.e. unsolicited repeated SMS messages originating from or sent to one or more subscribers of one or more mobile communication networks, the device comprising:
  an SMS clustering unit adapted to cluster SMS messages in similarity clusters, wherein each similarity cluster comprises SMS messages with identical or similar content;
  a counter adapted to count an amount of SMS messages in each similarity cluster;
  a rate monitor adapted to monitor a rate of SMS messages in each similarity cluster; and
  a spam classifier adapted to classify SMS messages of a similarity cluster as spam when the amount of SMS messages in the similarity cluster exceeds a certain first threshold and the rate of SMS messages for the similarity cluster exceeds a certain second threshold.

DETAILED DESCRIPTION OF EMBODIMENT(S)

Figure 1:
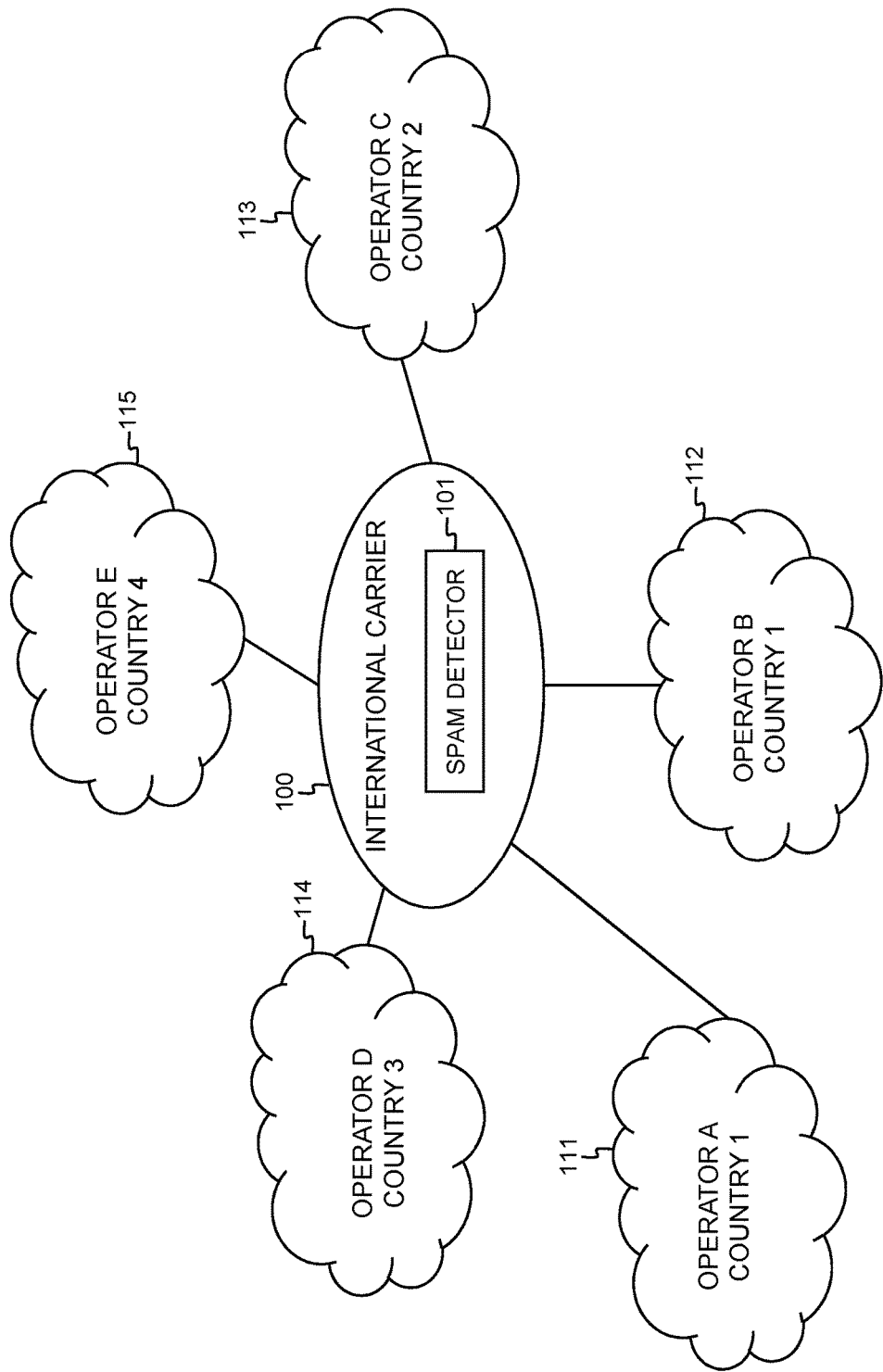
FIG. 1 illustrates a communication network wherein an embodiment of the method and device for spam SMS detection according to the present invention is implemented.

FIG. 1 shows a spam SMS detector 101 operating according to the present invention. The spam SMS detector is hosted and controlled by an international carrier 100 that handles traffic between different mobile network operators active in one or more geographical area, for instance operator A with mobile network 111 in country 1, operator B with mobile network 112 in country 1, operator C with mobile network 113 in country 2, operator D with mobile network 114 in country 3 and operator E with mobile network 115 in country 4. Although the present invention is not restricted thereto, hosting and controlling spam SMS detection by an international carrier brings the advantage that SMS messages with same or similar pattern are detected faster, in particular when multiple sources located in different countries are sourcing spam SMS from different networks. The international carrier indeed has a view on larger volumes of SMS traffic originating from and/or destined to multiple mobile networks in multiple geographical areas. Since the present invention relies on the volume of detected similar messages and the rate of detected similar messages, an international carrier can take benefit of its scale of traffic handling to faster detect and report the presence of spam SMS.

Figure 2:
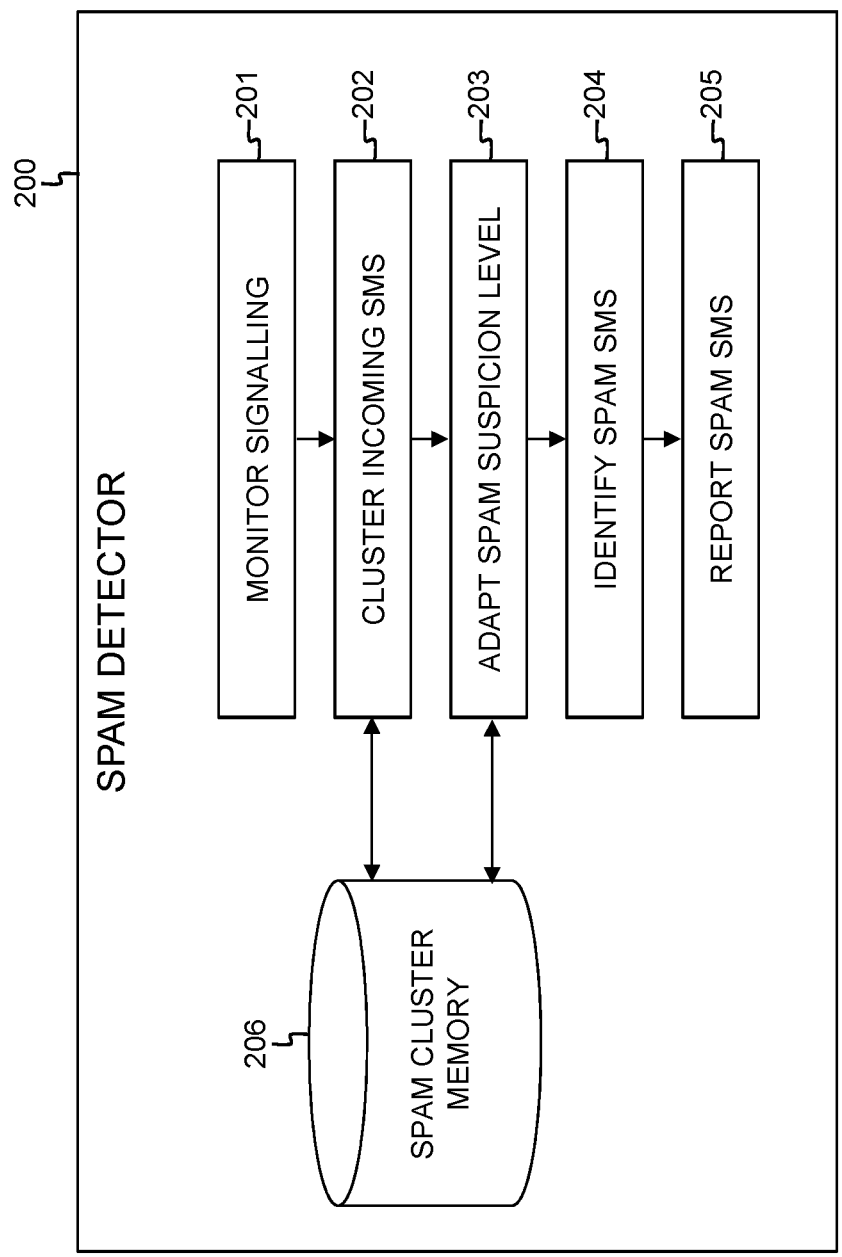
FIG. 2 is a functional block scheme illustrating an embodiment of the device 200 for spam SMS detection according to the present invention.

FIG. 2 shows the functional blocks of a spam SMS detector 200 according to the invention. The spam SMS detector 200 of FIG. 2 may coincide with the spam SMS detector 101 of FIG. 1. The spam SMS detector 200 comprises a signalling monitor 201, an SMS clustering unit 202, a unit 203 that adapts the spam suspicion level of SMS messages, a unit 204 that identifies spam SMS, and spam reporting unit 205. The spam detector further has a spam cluster memory 206, either integrated with the units 201-205 into a single device, or externally provisioned and coupled to at least the SMS clustering unit 202 and the unit that adapts the spam suspicion level 203.

The signalling monitor 201 consists of one or more signalling probe installed in the network of the international carrier 100 to observe SMS traffic. Incoming SMS traffic in the international carrier's network 100 is clustered by the incoming SMS clustering unit 202. Thereto, the clustering unit 202 applies local sensitivity hashing based on a cosine similarity measure calculated over the byte level distribution of the SMS text. As a result a hash value is determined that is used as basis for the clustering. All SMS messaged that share the same hash value are clustered together in a single cluster. For each cluster, a number of parameters are stored in the spam SMS cluster memory 206. The unique hash value is stored, as well as a counter counting the amount of SMS messages with same hash value. Further, the time whereon the last SMS message with a hash value was seen, may be stored. The spam suspicion level adaptation unit 203 consults the spam cluster memory 206 each time a new SMS message is received and its corresponding hash value is calculated. The spam suspicion level adaptation unit 203 adapts the stored amount of SMS messages received with that hash value, calculates the rate from the stored receipt time of the previous SMS message with same hash value and the new receipt time of an SMS message with same hash value, and updates the parameters stored in conjunction with the spam SMS cluster corresponding to that hash value in the spam cluster memory 206. Thereafter, the spam SMS identification unit 204 compares the amount of SMS messages with same hash value to a first threshold and compares the rate of arrival of the last SMS message(s) with same hash value to a second threshold. When both parameters exceed the respective thresholds they are compared to, the spam SMS identification unit 204 classifies the SMS cluster corresponding to that hash value as spam. All new SMS messages monitored by the signalling probe(s) 201 and generating the same hash value in 202 will immediately be classified as spam. The spam SMS messages are reported to the network operators of mobile networks 111, 112, 113, 114 and 115 to enable the respective operators of these mobile networks to implement the desired measures.

When looking into messages exchanged over the signalling network of an international carrier, one could differentiate and classify SMS traffic in one or more groups, non-exhaustive. A first group for instance constitutes fraud attempts, i.e. SMS messages triggering a user action that involves high termination costs for the user taking the action. A second group for instance constitutes unsolicited advertisements. A third group of SMS messages constitutes application-to-person messages, e.g. google-to-person messages, facebook-to-person messages, etc. A fourth type of SMS messages constitutes network information messages. Examples thereof are welcome SMS messages, SMS messages containing price information or information on campaigns, etc. A fifth group for instance constitutes person-to-person traffic, i.e. regular SMS text messages exchanged between subscribers. The first four categories of SMS traffic described here above by definition share a similarity pattern, a certain occurrence rate for each similarity pattern, and a certain pool of originating sources for each similarity pattern. The spam detection technique according to the present invention aims at distinguishing the first four categories of SMS traffic from the regular person-to-person messages.

Figure 3:
FIG. 3 is a table 300 with parameter values used in an embodiment of the method for spam SMS detection according to the present invention.

The technique underlying the present invention thereto relies on monitoring the volume and rate of similar SMS messages that is seen by the spam detector. In order to monitor the volume and rate and classify the SMS messages that belong to a similarity cluster as regular SMS traffic, suspicious SMS traffic or spam SMS traffic, a spam detector operating according to the principles of the invention requires a number of parameters. A sample set of parameters that can be used in an embodiment of the spam SMS detector according to the present invention is listed in table 300 drawn in FIG. 3. Table 300 lists a first time threshold T1 which is set equal to 1 minute in the example of FIG. 3. This first time threshold represents a maximum time interval wherein a second SMS message similar to a first SMS message must be received. If no second SMS message with same similarity value is received within a time interval of 1 minute from the first SMS message with a certain similarity value, than it is assumed that the first SMS message does not constitute spam. The corresponding cluster of SMS messages and parameter values like score or velocity are deleted from the SMS cluster memory. Table 300 lists a second time threshold T2 which is set equal to 5 minutes in the example of FIG. 3. The second time limit represents a time interval wherein suspicious SMS, i.e. SMS messages with a similarity value that has been encountered more than once within the first time threshold T1, is monitored for a longer period. Table 300 further lists a third time threshold T3 which is set equal to 24 hours in the example of FIG. 3. The third time limit represents a minimal time interval wherein spam clusters stay monitored. Table 300 also lists a first spam score threshold S1 which is set equal to 2 SMS messages in the example of FIG. 3. This first spam score threshold S1 represents the minimum amount of SMS messages with same spam key value that must be received within the time interval T2 in order to classify the messages as suspicious. It is in other words the trigger to increase the spam classification value or level of suspicion for a particular spam cluster. Table 300 further also lists a second spam score threshold S2 which is set equal to 50 SMS messages in the example of FIG. 3. This second spam score threshold S2 represents the minimum amount of SMS messages with same spam key value that must be received within the time interval T2 in order to classify the messages as spam. It is a first trigger or first condition that must be met in order to increase the spam classification value or level of suspicion for a particular spam cluster to the highest level. Table 300 at last also lists a velocity threshold V1 which is set equal to 1 SMS message per 5 minutes in the example of FIG. 3. This velocity threshold V1 represents the minimum velocity of SMS messages with same spam key value that must be achieved in order to classify the messages as spam. It is in other words a second trigger or condition that must be met to increase the spam classification value or level of suspicion for a particular spam cluster to the highest level.

Figure 4:
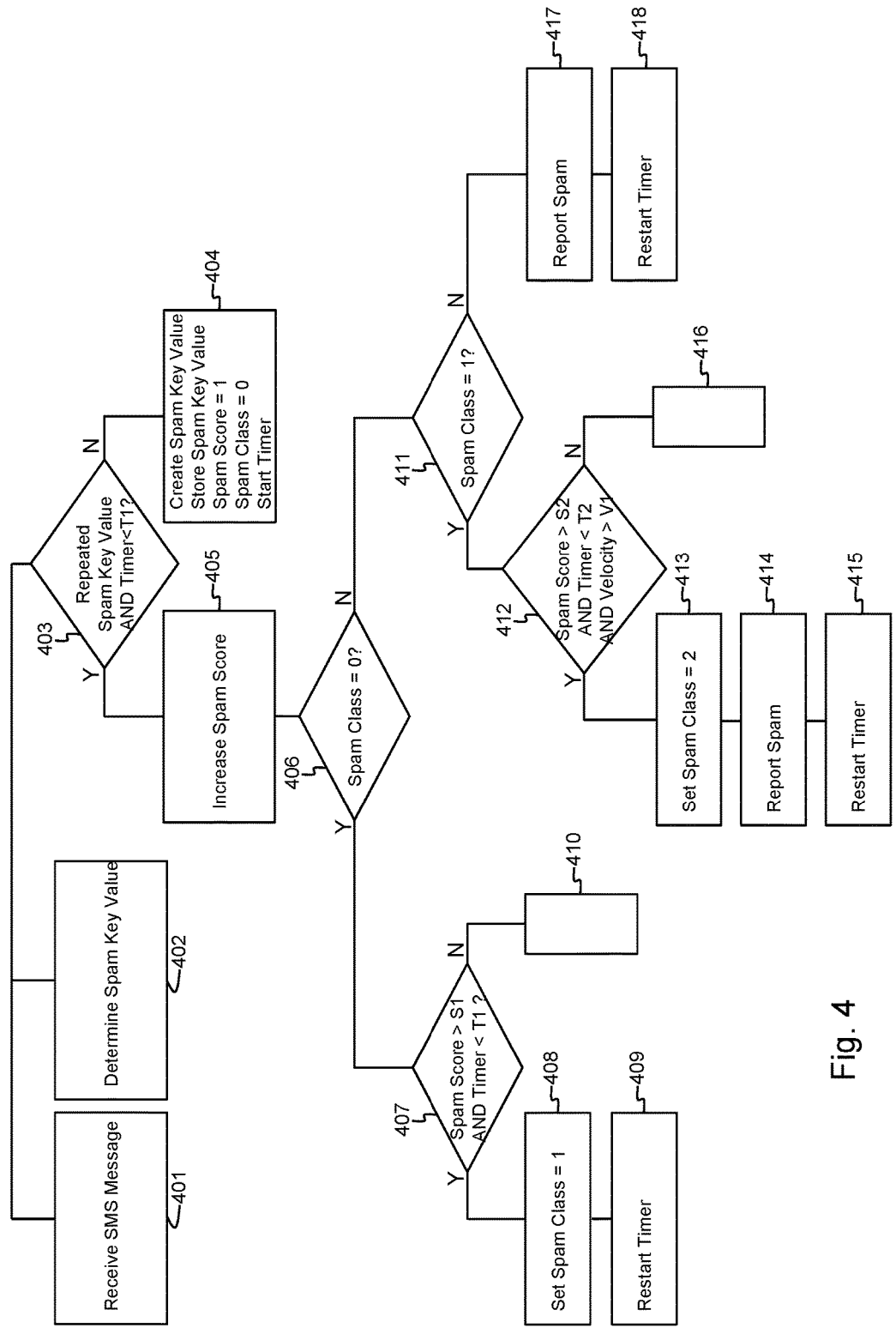
FIG. 4 is a diagram illustrating an embodiment of the method for spam SMS detection according to the present invention.

FIG. 4 represents a flow diagram of an embodiment of the spam SMS detection method according to the invention, as for instance executed by the spam SMS detector 101 shown in FIG. 1 or the spam SMS detector 200 shown in FIG. 2. In step 401, a signalling probe that forms part of the spam SMS detector receives an SMS message. Upon receipt of an SMS message, the spam SMS detector determines a spam key value to cluster the incoming SMS message. In step 402, the spam SMS detector thereto applies local sensitivity hashing, a known technique used in the domain of dimension reductions to group data into buckets or similarity clusters. The data or items clustered together share the same characteristics. The SMS clustering of step 402 is an inverse obfuscation technique that is used to group similar SMS messages. Even if the creator of spam SMS messages applied obfuscation techniques like the omission or addition of a few characters, the insertion of a unique link or code, etc., these SMS messages should be identified as similar messages in step 402 and consequently end up in the same spam cluster, having the same spam key value. In step 402, an initial bytes level distribution is determined for the received SMS message, resulting in a byte level histogram. Based on this histogram, a generic hash value is generated of the bytes-level distribution of the SMS message, the length of the SMS message, and some parameters calculated based on a distance function between the received SMS message and some reference values. The information used to determine the spam key value in step 402 and classify the SMS message in a spam cluster mainly can be divided in five categories:

- the top x % bytes distribution of the SMS message.
- the cosine similarity distance between the original byte-level distribution and some hypothetical byte-level distribution of a reference message having the same size as the maximum allowed message length. This cosine similarity distance can be calculated against a previously defined element in the top distribution (min, max or average) rounded with enough precision to the needed value used to express the expected sensitivity, or against a configured fixed value (min, max or average of the total scale) rounded with enough precision to the needed value used to express the expected sensitivity.
- an extension of the cosine similarity distance to blocks of text (configurable) so as to model an order or sequence in each defined group. This is needed to enforce the sensitivity especially in case of shorter texts where common characters are being used.
- the length of the message in order to enable messages with similar length to be grouped together. The message is normalized against the maximum length and scaled to fit the desired length.
- the Short Message Service Centre address or SMSC address, i.e. the calling network identification because spam messages typically share the same source or calling network. Adding the calling address to the spam key value calculation will enable language like clustering because the calling nodes will determine the language space for sent messages.

It is noticed that the above selection of parameters and algorithm for the spam key value calculation in step 402 is given only as an example. Any skilled person will appreciate that alternate combinations of parameters and/or alternate hash calculation algorithms may result in the calculation of a spam key value that enables to cluster incoming SMS messages in similarity clusters.

Once the spam key value is calculated in step 402, it is verified in step 403 if the spam key value is a repeated value. In other words, step 403 verifies if an earlier SMS message has been received for which the local sensitivity hashing algorithm of step 402 resulted in the same spam key value. If this is not the case, a new spam cluster is created in the spam cluster memory, as is indicated by step 404. For this new spam cluster, the spam key value is stored, the spam score is set to the initial value 1 (indicating that a single SMS message has been received for the cluster so far), the spam classifier is set to the initial value 0 (corresponding to the lowest suspicion level for being spam), and the timer is started.

The spam score is a counter that counts the number of SMS messages received and having the same spam key value. The spam classification value on the other hand is a parameter whose value indicates the level of suspicion. Initially, as long as no repeated pattern is detected, all SMS messages receive an associated spam classification value equal to 0. The spam classification value will be increased to 1 when a repeated pattern is detected but the spam detector still awaits confirmation before classifying the SMS messages of that cluster as spam. As soon as the repeated pattern meets certain minimum thresholds, as well in volume as in velocity, the spam classification value will be increased to 2 and the SMS messages belonging to the corresponding cluster will be categorized as spam.

When the spam key value calculated in step 402 for the received SMS message is found to be a repeated value in step 403, then the spam score of the corresponding spam cluster is increased by 1 in step 405. The message counter of the corresponding cluster in other words is increased to reflect that an additional SMS message with same spam key value has been received. For such repeated spam key value, it must now be verified in the next steps if the level of suspicion, i.e. the spam classification value, must be increased.

Step 406 first distinguishes spam clusters that were not yet suspicious from spam clusters that were already suspicious by verifying if the spam classification value is 0. In case the spam classification value is 0, the corresponding spam cluster was not yet considered suspicious because no or insufficient repeated pattern was detected so far. In this situation, it must be verified if arrival of the new SMS message allows to increase the level of suspicion from 0 to 1. Thereto, it is verified in step 407 if the spam score exceeds the first score threshold S1 and if the timer is still below the first time threshold T1. In other words, considering the table 300 of FIG. 3, step 407 verifies if more than 2 SMS messages having the same spam key value have been received within a time span of 60 seconds. If this is the case, the amount of similar SMS messages received within the time interval T1 exceeds the volume threshold S1, and the corresponding SMS cluster becomes suspected spam. The spam classification value is set 1 in step 408 and the timer is restarted to keep the suspected spam cluster in observation for a longer time interval T2. If it is determined in step 407 that the spam score does not yet exceed the first score threshold S1 and/or the timer has passed the first time threshold T1, no action is taken as is indicated by step 410.

In situations where the spam classification value is higher than 0, step 411 verifies if the received SMS message belongs to a cluster that is suspicious (spam classification value is 1) or alternately belongs to a cluster that is considered as spam (spam classification value is 2). In case the cluster is suspicious (spam classification value is 1), it must be verified if arrival of the new SMS message requires to increase the suspicion level of the cluster to the highest level possible, i.e. level 2, where the cluster will be considered as spam. In other words, it must be verified if the repetitive nature is strong enough in terms of volume and velocity to classify the corresponding spam cluster as spam. Thereto, step 412 checks if the spam score exceeds a second spam score threshold S2, the timer did not yet pass a second time threshold T2, and the velocity exceeds a velocity threshold V1. Again referring to the table 300 in FIG. 3, step 412 verifies if more than 50 similar SMS messages have been received in the past 5 minutes and the velocity has not dropped below 1 SMS per 5 minutes. If this is the case, the spam classification value is set 2 in step 413, the received SMS message is reported to be spam in step 414, and the timer is restarted in step 415 to place the corresponding cluster into monitoring for at least a time interval T3, e.g. 24 hours. If the volume of received similar SMS messages does not exceed the second score threshold S2 or the velocity of similar messages has dropped below the velocity threshold V1, no action needs to be taken in step 416.

In case the spam classification value of the cluster whereto the received SMS message belongs is already 2, the received SMS message belongs to a cluster that was already previously identified as spam. The newly received SMS message is then immediately classified as spam and this is reported in step 417. The timer is restarted in step 418 to keep the corresponding cluster monitored for at least another 24 hours.

Figure 5:
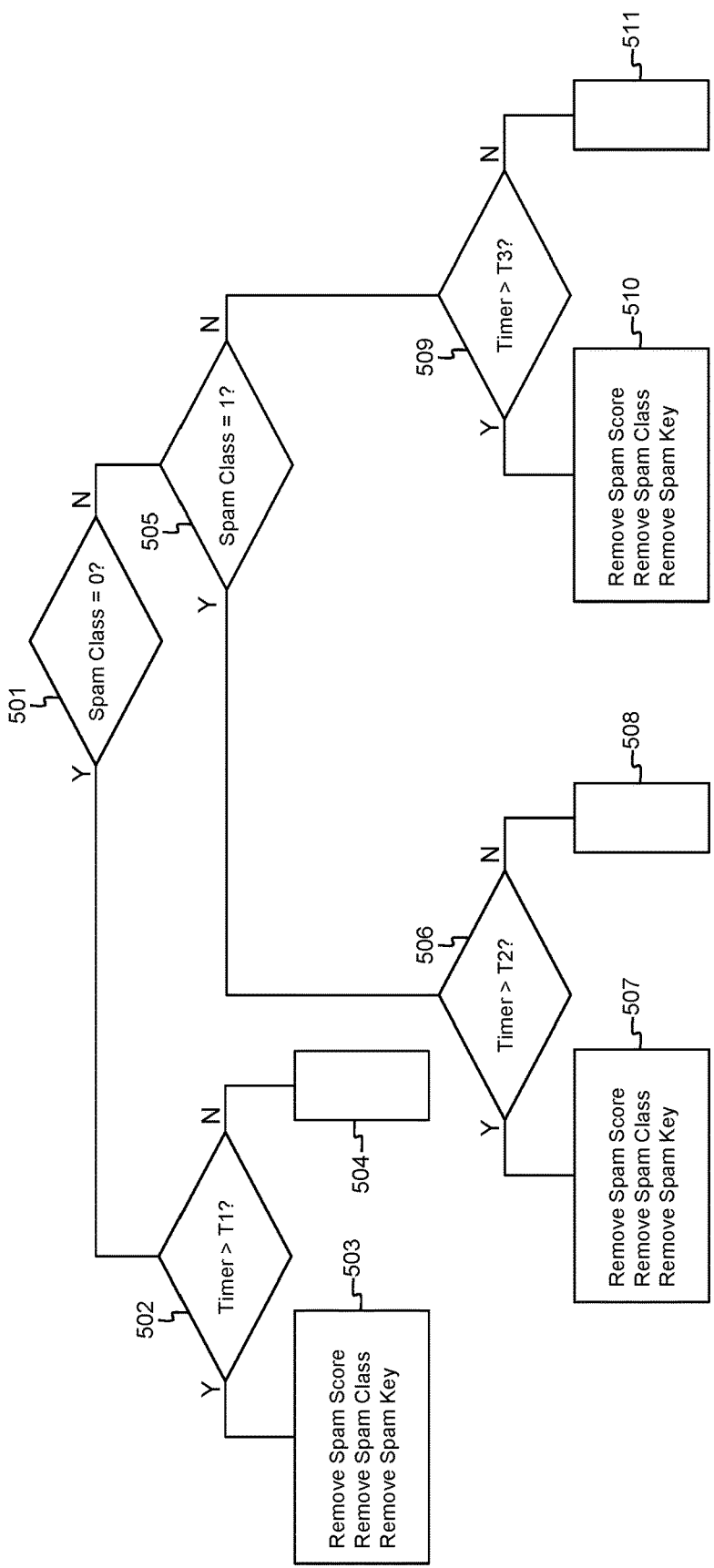
FIG. 5 is a diagram illustrating the operation of a timer in an embodiment of the method for spam SMS detection according to the present invention.

FIG. 5 is a flow diagram illustrating the operation of the timer that is managed for each spam cluster. At regular time intervals, each timer is managed according to the scheme of FIG. 5 to determine if certain created spam clusters are expired and can be removed from the spam cluster memory to avoid that memory space is unnecessarily kept occupied. In step 501 it is first verified if the spam classification value corresponding with the timer is equal to 0. If this is the case and step 502 reveals that the timer exceeds the first time threshold T1, no sufficient repeated pattern has been detected within the first time threshold T1. In such case, the spam key value, spam score and spam classification value are removed from storage in step 503 to free-up memory space. If on the other hand, it is detected in step 505 that the spam classification value is 1, the timer must be compared to a second time threshold T2 wherein the suspicious cluster is kept in observation. If step 506 reveals that the timer has passed the second time threshold T2, no timely confirmation is obtained that the suspected cluster represents spam. Again, the corresponding spam key value, spam score and spam classification value can be removed from storage in step 507 to free-up memory space. At last, i.e. for spam clusters that have a spam classification value equal to 2, it is verified in step 509 if the timer exceeds a third time threshold T3. If this is the case, no repeated SMS messages have been seen during a passed time interval with duration T3. It is therefore concluded that the spammer has become inactive which again allows to remove the corresponding spam key value, spam classification value and spam score from the memory in step 510. In all other situations, as reflected by steps 504, 508 and 511 in FIG. 5, the spam key value, spam score and spam classification value of the corresponding cluster are kept stored at least until the next point in time where the timers are evaluated and managed through execution of a new iteration of the scheme of FIG. 5.

It is noticed that although the above described embodiment of the method and device for detecting spam SMS messages distinguishes three levels—spam classification values 0, 1 and 2—the skilled person will appreciate that alternative embodiments of the method or device according to the invention that implement more levels of spam classification values can be contemplated. Depending on the amount of SMS messages in a similarity cluster passing certain thresholds and/or the rate of SMS messages in a similarity cluster passing certain thresholds, the spam classification value associated with the similarity cluster will change and a different treatment may be given to the SMS messages depending on the spam classification value.

Figure 6:
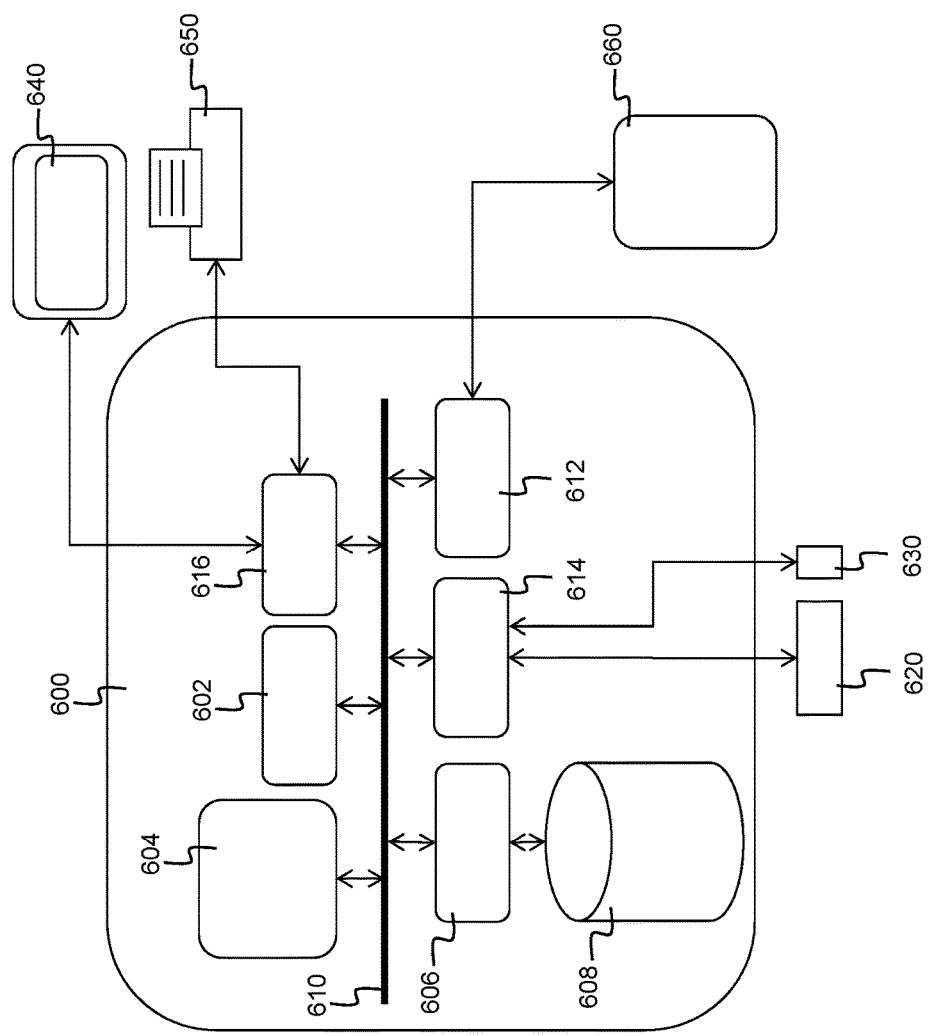
FIG. 6 illustrates a computer system able to perform embodiments of the method for spam SMS detection according to the present invention.

FIG. 6 shows a suitable computing system 600 for hosting the device for spam SMS detection according to the invention, an embodiments of which is illustrated by FIG. 2. Computing system 600 may in general be formed as a suitable general purpose computer and comprise a bus 610, a processor 602, a local memory 604, one or more optional input interfaces 614, one or more optional output interfaces 816, a communication interface 612, a storage element interface 606 and one or more storage elements 608. Bus 610 may comprise one or more conductors that permit communication among the components of the computing system. Processor 602 may include any type of conventional processor or microprocessor that interprets and executes programming instructions. Local memory 604 may include a random access memory (RAM) or another type of dynamic storage device that stores information and instructions for execution by processor 602 and/or a read only memory (ROM) or another type of static storage device that stores static information and instructions for use by processor 604. Input interface 614 may comprise one or more conventional mechanisms that permit an operator to input information to the computing device 600, such as a keyboard 620, a mouse 630, a pen, voice recognition and/or biometric mechanisms, etc. Output interface 616 may comprise one or more conventional mechanisms that output information to the operator, such as a display 640, a printer 650, a speaker, etc. Communication interface 612 may comprise any transceiver-like mechanism such as for example two 1 Gb Ethernet interfaces that enables computing system 600 to communicate with other devices and/or systems, for example mechanisms for communicating with one or more other computing systems. The communication interface 612 of computing system 600 may be connected to such another computing system 660 by means of a local area network (LAN) or a wide area network (WAN, such as for example the internet, in which case the other computing system may for example comprise a suitable web server. Storage element interface 606 may comprise a storage interface such as for example a Serial Advanced Technology Attachment (SATA) interface or a Small Computer System Interface (SCSI) for connecting bus 610 to one or more storage elements 608, such as one or more local disks, for example 1 TB SATA disk drives, and control the reading and writing of data to and/or from these storage elements 608. Although the storage elements 608 above is described as a local disk, in general any other suitable computer-readable media such as a removable magnetic disk, optical storage media such as a CD or DVD, -ROM disk, solid state drives, flash memory cards, . . . could be used.

The steps executed in the method for spam SMS detection according to the present invention, illustrated by the above embodiments, may be implemented as programming instructions stored in local memory 604 of the computing system 600 for execution by its processor 602. Alternatively the instructions may be stored on the storage element 608 or be accessible from another computing system through the communication interface 612.

Although the present invention has been illustrated by reference to specific embodiments, it will be apparent to those skilled in the art that the invention is not limited to the details of the foregoing illustrative embodiments, and that the present invention may be embodied with various changes and modifications without departing from the scope thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein. In other words, it is contemplated to cover any and all modifications, variations or equivalents that fall within the scope of the basic underlying principles and whose essential attributes are claimed in this patent application. It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned. The terms "first", "second", third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the invention are capable of operating according to the present invention in other sequences, or in orientations different from the one(s) described or illustrated above.

The invention claimed is:

1. A method to detect spam SMS messages, i.e. unsolicited repeated SMS messages originating from or sent to one or more subscribers of one or more mobile communication networks, said method comprising:
   clustering SMS messages in similarity clusters, wherein each similarity cluster comprises SMS messages with identical or similar content; and
   monitoring a rate of SMS messages in each similarity cluster,
   wherein said method further comprises:
   counting an amount of SMS messages in each similarity cluster; and
   classifying SMS messages of a similarity cluster as spam when said amount of SMS messages in said similarity cluster exceeds a certain first threshold and said rate of SMS messages for said similarity cluster exceeds a certain second threshold.

2. A method to detect spam SMS messages according to claim 1, said method comprising:
   upon receipt of each SMS message, determining a spam key value by applying locality-sensitive hashing, each spam key value corresponding to a similarity cluster of said similarity clusters;
   determining a spam classification value as 0 when said spam key value is no repeated value, or as a value greater than 0 when said spam key value is a repeated value, said value greater than 0 being determined based on a spam score, i.e. said amount of SMS messages in said similarity cluster corresponding to said spam key value, and a spam velocity, i.e. said rate of SMS messages in said similarity cluster having said spam key value; and
   storing said spam key value, associated spam score and associated spam classification value for said similarity cluster in memory.

3. A method to detect spam SMS messages according to claim 2, wherein said locality-sensitive hashing determines a hash value for said SMS message corresponding to said spam key value for said SMS message from:
   a top x % bytes distribution of said SMS message, x being a configurable parameter chosen in the range between 30 and 40;
   a similarity distance between said top x % bytes distribution and a hypothetical distribution;
   a similarity distance value between blocks of text;
   the length of said SMS message; and
   the calling address of said SMS message.

4. A method to detect spam SMS messages according to claim 3, wherein said similarity distance between said top x % bytes distribution and a hypothetical distribution corresponds to a cosine similarity distance, and said similarity distance value between blocks of text corresponds to a cosine similarity distance.

5. A method to detect spam SMS messages according to claim 2, wherein, when said spam key value is no repeated value, determining said spam classification value comprises:
   making said spam classification value 0; and
   storing said spam key value, associated spam score and associated spam classification value in memory.

6. A method to detect spam SMS messages according to claim 5, wherein storage of said spam key value, associated spam score and associated spam classification value expires when a first time threshold exceeds and no repeated SMS message with identical spam key value is received.

7. A method to detect spam SMS messages according to claim 2, wherein, when said spam key value is a repeated value with associated spam classification value equal to 0, determining said spam classification value comprises:
   increasing an associated spam score for said spam key value by 1; and
   making said spam classification value equal to 1 when said spam score exceeds a first spam threshold within a first time threshold.

8. A method to detect spam SMS messages according to claim 7, wherein storage of said spam key value, associated spam score and associated spam classification value expires when a second time threshold exceeds and no repeated SMS message with identical spam key value is received or alternatively when said spam velocity drops below a first spam velocity threshold.

9. A method to detect spam SMS messages according to claim 2, wherein, when said spam key value is a repeated value with associated spam classification value equal to 1, determining said spam classification value comprises:
   increasing an associated spam score for said spam key value by 1;
   making said spam classification value equal to 2; and
   reporting presence of a spam SMS message.

10. A method to detect spam SMS messages according to claim 9, wherein storage of said spam key value, associated spam score and associated spam classification value expires when a third time threshold exceeds and no repeated SMS message with identical spam key value is received or alternatively when said spam velocity drops below a second spam velocity threshold.

11. A device to detect spam SMS messages, i.e. unsolicited repeated SMS messages originating from or sent to one or more subscribers of one or more mobile communication networks, said device comprising:
   an SMS clustering unit adapted to cluster SMS messages in similarity clusters, wherein each similarity cluster comprises SMS messages with identical or similar content; and
   a rate monitor adapted to monitor a rate of SMS messages in each similarity cluster;
   wherein said device further comprises:
   a counter adapted to count an amount of SMS messages in each similarity cluster; and
   a spam classifier adapted to classify SMS messages of a similarity cluster as spam when said amount of SMS messages in said similarity cluster exceeds a certain first threshold and said rate of SMS messages for said similarity cluster exceeds a certain second threshold.

* * * * *